(12) United States Patent
Ivanovic et al.

(10) Patent No.: US 10,198,034 B2
(45) Date of Patent: Feb. 5, 2019

(54) WEARABLE ELECTRONIC BADGE

(71) Applicant: The Badger Crew LLC, Phoenix, AZ (US)

(72) Inventors: Darko Ivanovic, Podgorica (ME); Marko Gosovic, Podgorica (ME); Lazar Obrenovic, Podgorica (ME); Goran Gosovic, Podgorica (ME); Jovan Gosovic, Podgorica (ME)

( * ) Notice: Subject to any disclaimer, the term of this patent is extended or adjusted under 35 U.S.C. 154(b) by 0 days.

(21) Appl. No.: 15/581,017

(22) Filed: Apr. 28, 2017

(65) Prior Publication Data
US 2017/0315583 A1   Nov. 2, 2017

Related U.S. Application Data

(60) Provisional application No. 62/329,198, filed on Apr. 29, 2016.

(51) Int. Cl.
| | |
|---|---|
| *G06F 1/16* | (2006.01) |
| *H04B 1/3827* | (2015.01) |
| *G06F 17/30* | (2006.01) |
| *G04G 21/02* | (2010.01) |
| *H04W 4/02* | (2018.01) |
| *H04M 1/725* | (2006.01) |
| *G06F 3/0488* | (2013.01) |
| *H04L 29/08* | (2006.01) |

(52) U.S. Cl.
CPC ........ *G06F 1/163* (2013.01); *G06F 17/30867* (2013.01); *H04B 1/385* (2013.01); *G04G 21/02* (2013.01); *G06F 3/0488* (2013.01); *H04L 67/02* (2013.01); *H04M 1/7253* (2013.01); *H04W 4/027* (2013.01)

(58) Field of Classification Search
CPC ........................... G06F 1/163; G06F 17/30867
USPC ...................................................... 361/679.03
See application file for complete search history.

(56) References Cited

U.S. PATENT DOCUMENTS

| | | | |
|---|---|---|---|
| 7,176,849 B1 * | 2/2007 | Mooney | G07C 9/00031 345/2.3 |
| 9,183,306 B2 * | 11/2015 | Robarts | G06F 17/30867 |
| 2016/0018846 A1 * | 1/2016 | Zenoff | G09G 3/002 345/174 |
| 2016/0018978 A1 | 1/2016 | Zenoff | |
| 2016/0026423 A1 | 1/2016 | Zenoff | |
| 2016/0048369 A1 | 2/2016 | Zenoff | |
| 2016/0048370 A1 | 2/2016 | Zenoff | |
| 2016/0125677 A1 * | 5/2016 | Williams | G07C 9/00111 340/5.81 |
| 2017/0094459 A1 * | 3/2017 | Leclerc | H04L 67/22 |
| 2017/0205854 A1 | 7/2017 | Zenoff | |

(Continued)

*Primary Examiner* — Nidhi Thaker
(74) *Attorney, Agent, or Firm* — Brad Bertoglio (57) ABSTRACT

An electronic badge may be worn by a user to enable public communication and expression. The badge includes an electronic display screen, and one or more wireless transceivers. The wireless transceivers may communicate with wireless base stations or beacons to track user presence at a particular location. A smartphone application may be utilized by users to control badge display content and/or facilitate interaction with third party information services, such as social media services, event attendance services, or advertising services. In other embodiments, the badge may communicate directly with such third party services.

4 Claims, 10 Drawing Sheets

(56) References Cited

U.S. PATENT DOCUMENTS

2017/0232300 A1\* 8/2017 Tran ........................ H04L 67/12
434/247

\* cited by examiner

FIG. 10

WEARABLE ELECTRONIC BADGE

TECHNICAL FIELD

The present disclosure relates in general to wearable electronic devices, and in particular to an electronic badge implementing wireless communications.

BACKGROUND

The screens of mobile electronic devices commonly used today are focused on the user. They communicate intimately with the user, according to the principle of private screens. While a limited number of mobile device applications contemplate viewing by individuals other than the user, they typically require awkward interactions in which a user alternatively faces the device inward to interact with application user interface elements, then temporarily holds the mobile device outwards for others to view, temporarily precluding the user from viewing or using the device. As a result, public-facing uses for mobile electronic devices have been very limited.

SUMMARY

Despite the expansion of portable devices, users are yet to be offered devices with screens that communicate in reverse logic, on the principle of public display, from the user to the people in his or her surroundings. In accordance with some embodiments, it may be desirable to allow users to communicate seamlessly with others from a distance, such as to show their feelings and preferences. Also, it may be desirable to provide a device that can be paired with other devices in educational and conference industries, track a user's position and distance traveled, and display information for others around them to view, while communicating in the real world. Embodiments of a wearable product can not only speak "to," but also "about" the user. Embodiments may also cause the rebirth of the old accessory pinned badge—an appealing device that existed in the same unchanged form for decades—turning it into a modern way of communication and fashion accessory of the new generation.

Some embodiments of the present invention are generally directed to electronic badges having electronic displays and integrated wireless communication capabilities. Embodiments may also offer the ability to communicate at multiple levels in a very modern and different way. It may represent a style statement and a fashion accessory, and in the same time a direct means of communication with the environment with specific messages, such as slogans, status updates, multimedia content, or display of content from one or more of a user's social media feeds.

Embodiments can be used in academic surroundings with enhanced communication with devices that generate data from students' exams and homework and display it in the wearable device, thus shortening the time for forming groups in class, and allowing communication to be faster.

Embodiments can be used in the hotel and/or conference industries, replacing name tags. Some embodiments may wirelessly communicate with hotel databases to populate user information such as name, occupation, room number, and/or preferences of the guest. Such information may be populated immediately and automatically, as the guest walks into a venue. This will not only avoid creating confusion and delays during conferences but also save money on badges and name tags in the long term for the hotels/resorts.

These and other devices, methods and applications are described further herein throughout.

DETAILED DESCRIPTION OF THE DRAWINGS

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Figure 1:
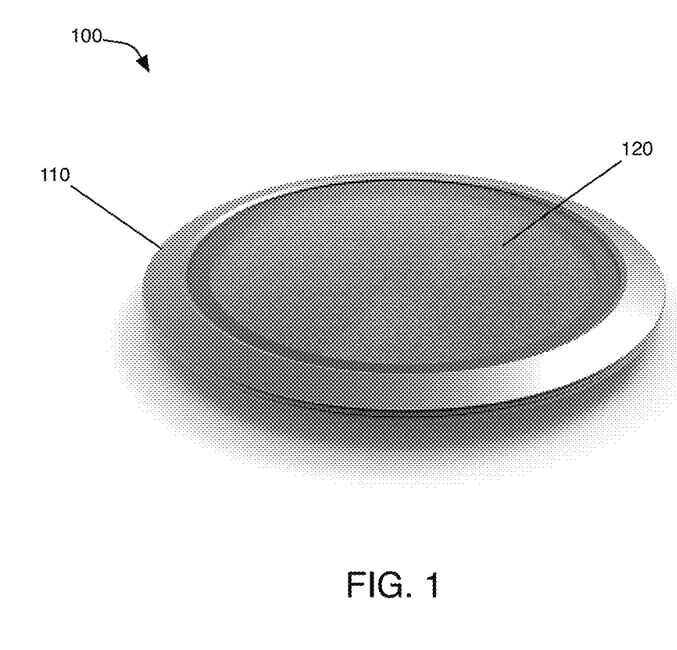
FIG. 1 is a front perspective view of a wireless electronic badge.

FIG. 1 is a front perspective view of a wearable electronic badge, in accordance with an exemplary embodiment. Badge 100 includes bezel 110, surrounding display screen 120. Bezel 110 and display screen 120 have a circular perimeter. Display screen 120 may be implemented using any of a variety of different electronic display technologies, including, without limitation, LCD, OLED, AMOLED, TFTLC and e-paper. Display screen 120 may be of any size, according to customer and market requirements, but will generally be sized for convenient wearing by a user, e.g. via attachment with a clip, pin or lanyard. Display screen 120 is positioned on an outwardly-facing surface of the badge, such that it may be readily viewed by others while attached to, e.g., a user's clothing, jacket, other item of apparel, handbag, briefcase, backpack or the like.

Figure 2:
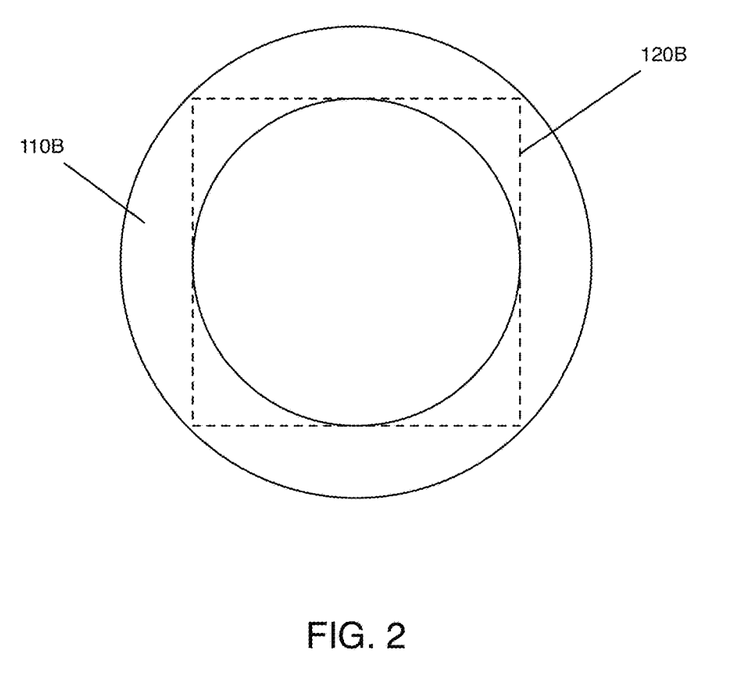
FIG. 2 is a schematic top plan view of a badge bezel and display, in accordance with some embodiments.

In some embodiments, it may be desirable to provide a wearable device having a circular display shape as illustrated in FIG. 1. However, commercially-available electronic display screens are commonly rectangular in shape. Therefore, it may be desirable to utilize a wearable device bezel, such as bezel 110, to expose a circular portion of a rectangular display screen. A device microcontroller assembly can then drive the exposed, circular, central portion of the rectangular display screen, providing a circular appearance to the user with commonly-available, commodity rectangular displays. FIG. 2 is a schematic representation of such an arrangement. Display screen 120B is a rectangular screen, with bezel 110B exposing a circular center portion of the underlying square display screen to the user and those around the user.

Figure 3:
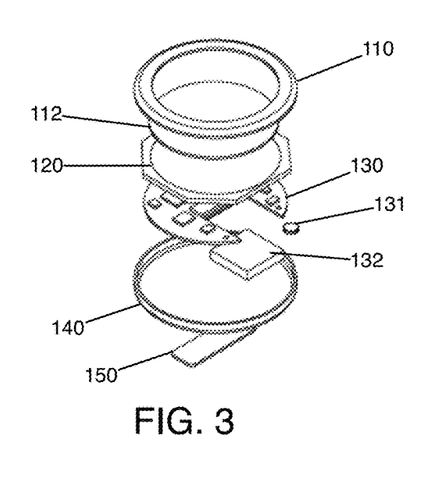
FIG. 3 is an exploded perspective view of a wireless electronic badge with circular display screen.
Figure 4:
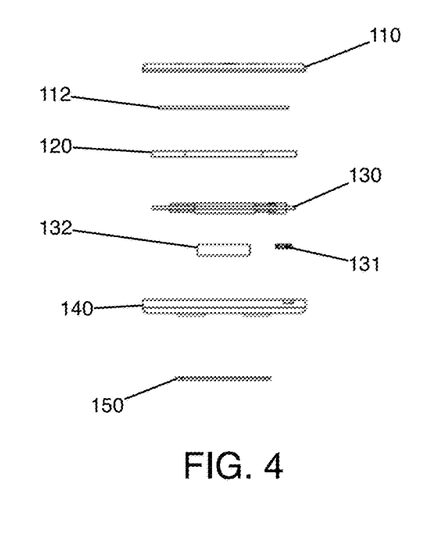
FIG. 4 is an exploded elevation of a wireless electronic badge with circular display screen.

FIG. 3 is an exploded perspective view of a round badge using a round display screen, in accordance with the exemplary embodiment of FIG. 1. The view includes (from top to bottom): a bezel 110, protective glass 112, a display screen 120, a main printed circuit board 130, magnet 131, battery 132, rear casing 140 and attachment structure 150. Magnet 131, which may be a neodymium magnet, may be utilized for magnet attachment of badge 100; for example, the badget may be worn outside an article of clothing, with a thin metal bar positioned on the opposite side of the article of clothing, with badge 100 held in position by attraction of the metal bar to magnet 131, thereby securing both to the article of clothing. FIG. 4 is a side elevation of the embodiment of FIG. 3.

Figure 5:
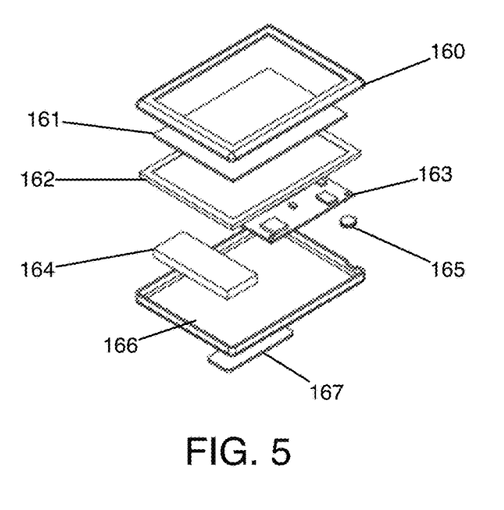
FIG. 5 is an exploded perspective view of a wireless electronic badge with rectangular display screen.
Figure 6:
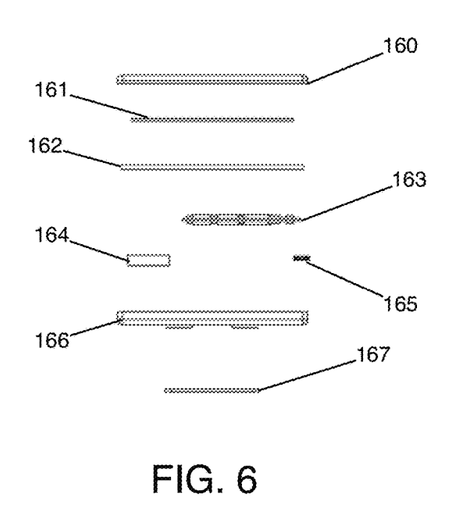
FIG. 6 is an exploded elevation of a wireless electronic badge with rectangular display screen.

FIG. 5 is an exploded perspective view of a square or rectangular badge embodiment, having an analogous construction to the embodiment of FIG. 3, including: rectangular bezel 160, protective glass 161, display screen 162, printed circuit board 163, battery 164, magnet 165, rear casing 166 and attachment structure 167. FIG. 6 is a side elevation of the exploded view of FIG. 5.

Figure 7:
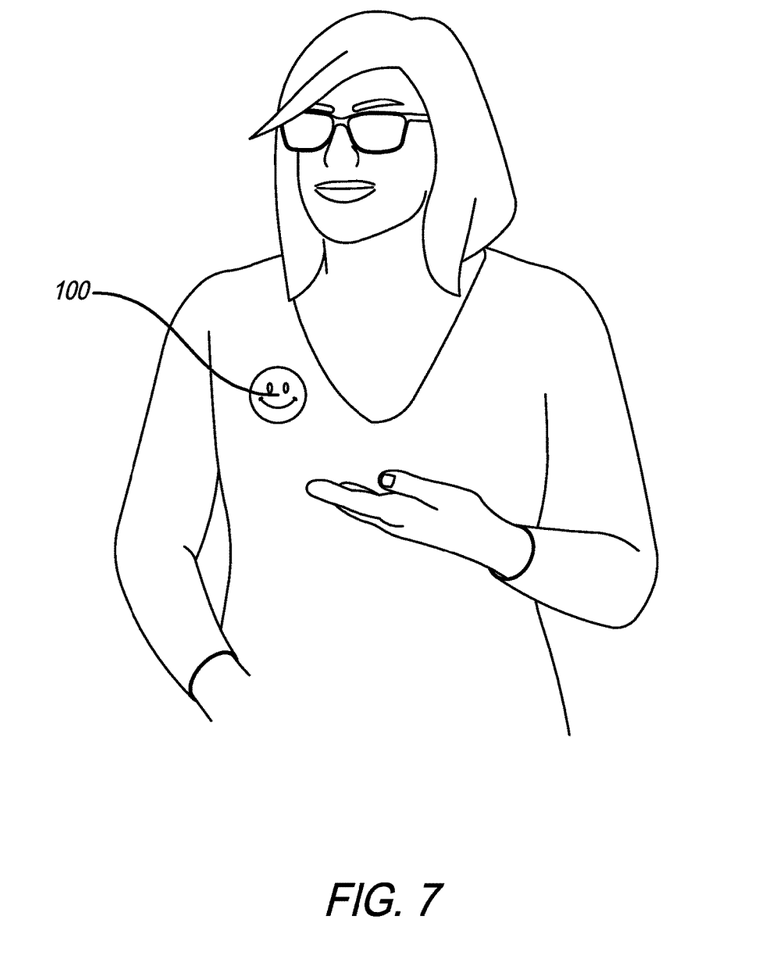
FIG. 7 is a front view of a wireless electronic badge as worn by a user.

FIG. 7 illustrates wearable device 100 in use, as worn by an exemplary user.

Figure 8:
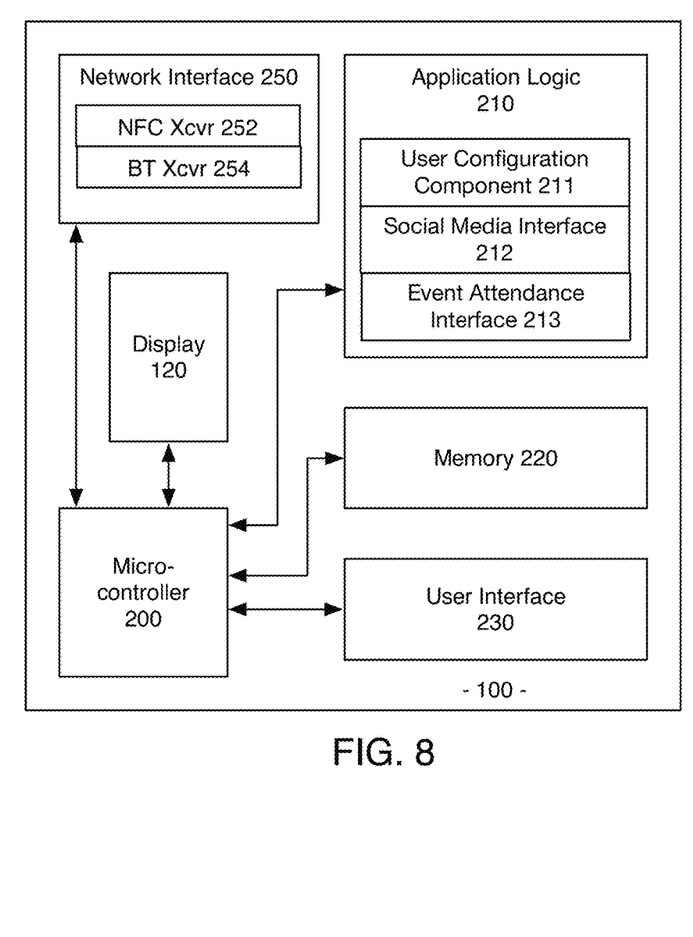
FIG. 8 is a schematic block diagram of a wireless electronic badge.

FIG. 8 is a schematic block diagram of wearable device 100.

Microcontroller 200, which may include a programmable microprocessor and other associated integrated circuits mounted on printed circuit board 130, implements application logic 210, and stores and retrieves data from memory 220. Microcontroller 200 further drives display 120, and communicates data with external devices via network interface 250. Network interface 250 may include, e.g., NFC transceiver 252 and Bluetooth transceiver 254. Network interface 250 preferably implements low power secure wireless communication channels, such as Bluetooth LE, NFC, WiFi and/or other acceptable transfer methods, preferably selected to maximize device operation while minimizing battery size. In such embodiments, user control of wearable 100 (such as setting configuration, loading of images and other content) can be accomplished via another user personal electronic device communicating with wearable 100, such as a smartphone or tablet computer similarly capable of BT-LE or NFC communications. However, in other embodiments, badge 100 may include an integrated wireless Ethernet adapter, enabling secured communication directly between microcontroller 200 and Internet-connected systems and devices.

Wearable device 100 optionally includes user interface mechanism 230 enabling a user to directly interact with wearable device 100, in addition to or instead of accessing badge 100 via another user electronic device. In some embodiments, user interface mechanism 230 includes touch screen sensors integrated into display 120. In some embodiments, user interface mechanism 230 may include buttons and/or touch-sensitive portions of bezel 110.

Badge 100 may include one or more mechanisms to secure badge 100 to a user's clothing. Traditionally, some users prefer attaching badges with a pin mechanism. Other users prefer attaching badges with a magnetic attachment mechanism (e.g. a flat metallic bar attracted to internal magnet 131), thereby avoiding piercing a clothing item.

FIG. 9 illustrates one possible embodiment of a mechanism to secure badge 100 to a user's clothing, allowing a user to select amongst pin or magnetic attachment mechanisms. For clarity, FIG. 9A shows a rear perspective view of pin 100, with backside magnets excluded. Pin mechanism 500 is secured to the back side of badge 100, and is typically formed from spring steel. Pin mechanism 500 includes circumferential portion 501, extending around the perimeter of the back side of badge 100. Pin 502 bisects the middle of the back side of badge 100, and can be alternatively engaged or disengaged from hook 504.

Figure 9A:
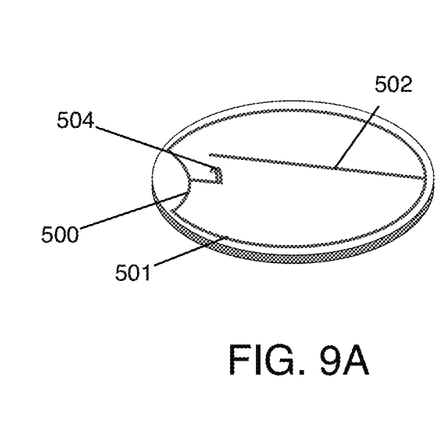
FIG. 9A is a partial rear perspective view of a wireless electronic badge, showing a pin attachment mechanism.
Figure 9B:
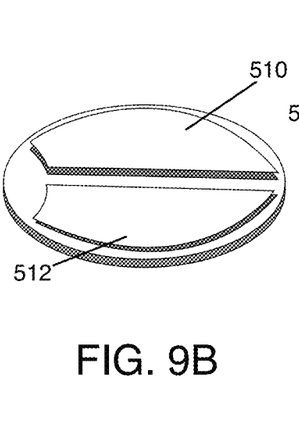
FIG. 9B is a partial rear perspective view of a wireless electronic badge, showing a magnetic attachment mechanism.
Figure 9C:
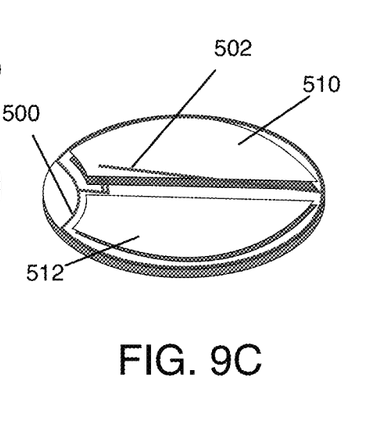
FIG. 9C is a rear perspective view of a wireless electronic badge having both pin and magnetic attachment mechanisms.

FIG. 9B shows a partial rear perspective view of pin 100, with pin mechanism 500 excluded. Magnet portions 510 and 512 are each thin layers of magnetic material secured to the backside of badge 100 (e.g. via adhesive). Magnet portions 510 and 512 are shaped and positioned within the circumference formed by pin circumferential portion 501, while leaving a central channel between them extending across the centerline of the badge rear surface, through which channel pin 502 may rest while in pin portion 502 is engaged with hook portion 504. FIG. 9C illustrates a rear perspective view of the complete multi-functional attachment assembly.

In use, a user of the embodiment of FIG. 9 can secure badge 100 using either a magnetic or pin-based attachment mechanism, as desired by the user. FIG. 9D illustrates a mechanism for variable magnetic or pin-based attachment, using a metal backing plate. For magnetic attachment, metal backing plate 530 is provided to the user for placement behind a user's layer of clothing. Metal backing plate 530 preferably is formed with a size and shape that matches, or falls within, the outer perimeter formed by bezel 110 and/or rear casing 140; in the embodiment for FIG. 9, backing plate 530 has a circular periphery with a diameter equal to or slightly less than rear casing 140. Badge case magnets 510 and 512 attract metal backing plate 530 to secure badge 100 to the user. FIG. 9E provides an exploded view of badge 100, as attached using the magnetic attachment mechanism of backing plate 530. Fabric layer 900 of a user's article of clothing, such as a shirt or jacket, is interposed between backing plate 530 and rear casing magnets 510 and 512. The force of magnetic attraction between plate 530 and magnets 510 and 512 causes friction between badge rear surface 514, clothing 900 and backing plate 530, thereby securing badge 100 in place.

Figure 9D:
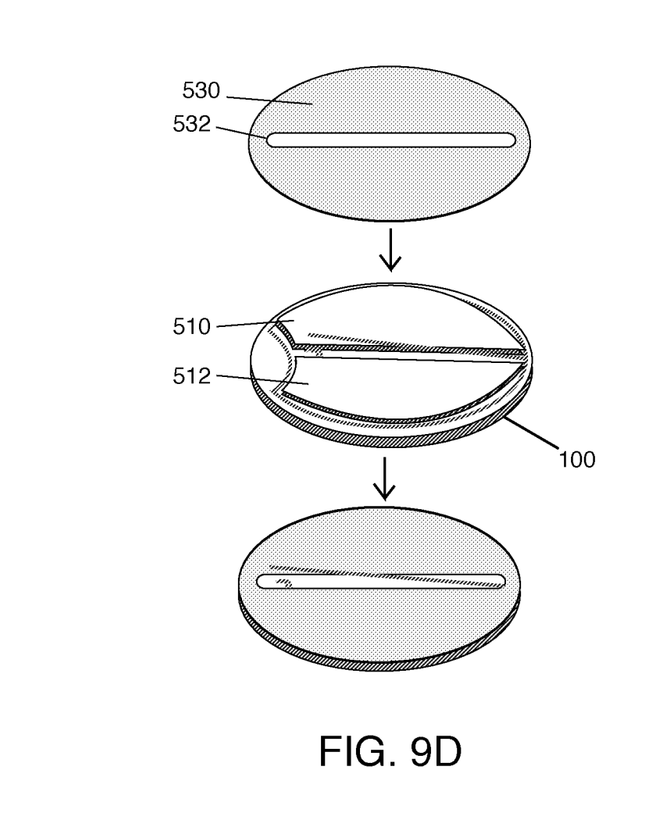
FIG. 9D is a rear perspective view of a wireless electronic badge with removable magnetic backing plate.
Figure 9E:
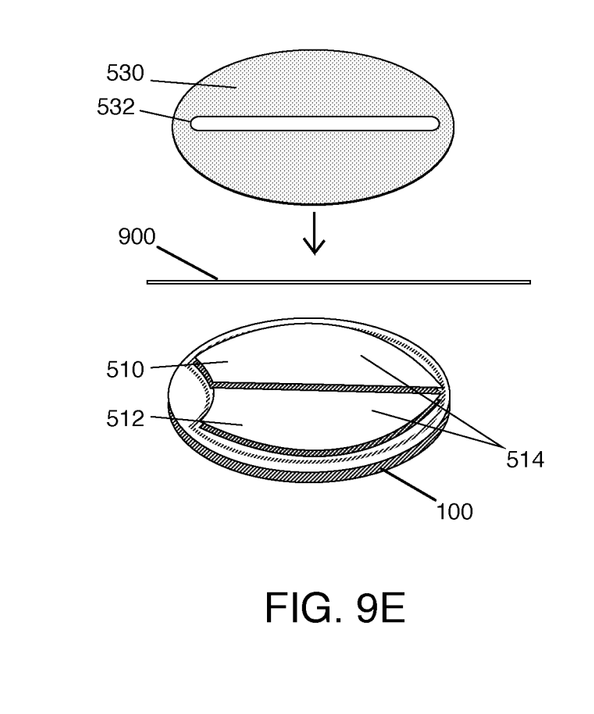
FIG. 9E is an exploded view of a wireless electronic badge mounted to clothing using a magnetic attachment mechanism.

When not in use or during attachment using the pin mechanism, metal backing plate 530 can be placed directly onto magnets 510 and 512 for convenient storage. (Alternatively, metal backing plate 530 can be stored elsewhere, or discarded.) Preferably, metal backing plate 530 includes central open channel 532, extending across a central line of backing plate 530 and oriented above the positions of pin 502 and hook 504, such that pin 502 can extend beyond metal backing plate 530 for securing to a user's clothing or other item, before engagement with hook 504—all while backing plate 530 remains magnetically stowed on the backside of badge 100. A user may therefore choose between magnetic and pin-based attachment, depending on the use case and user preferences, while conveniently stowing backing plate 530 on badge 100 to prevent loss.

Personal Content Sharing

Figure 10:
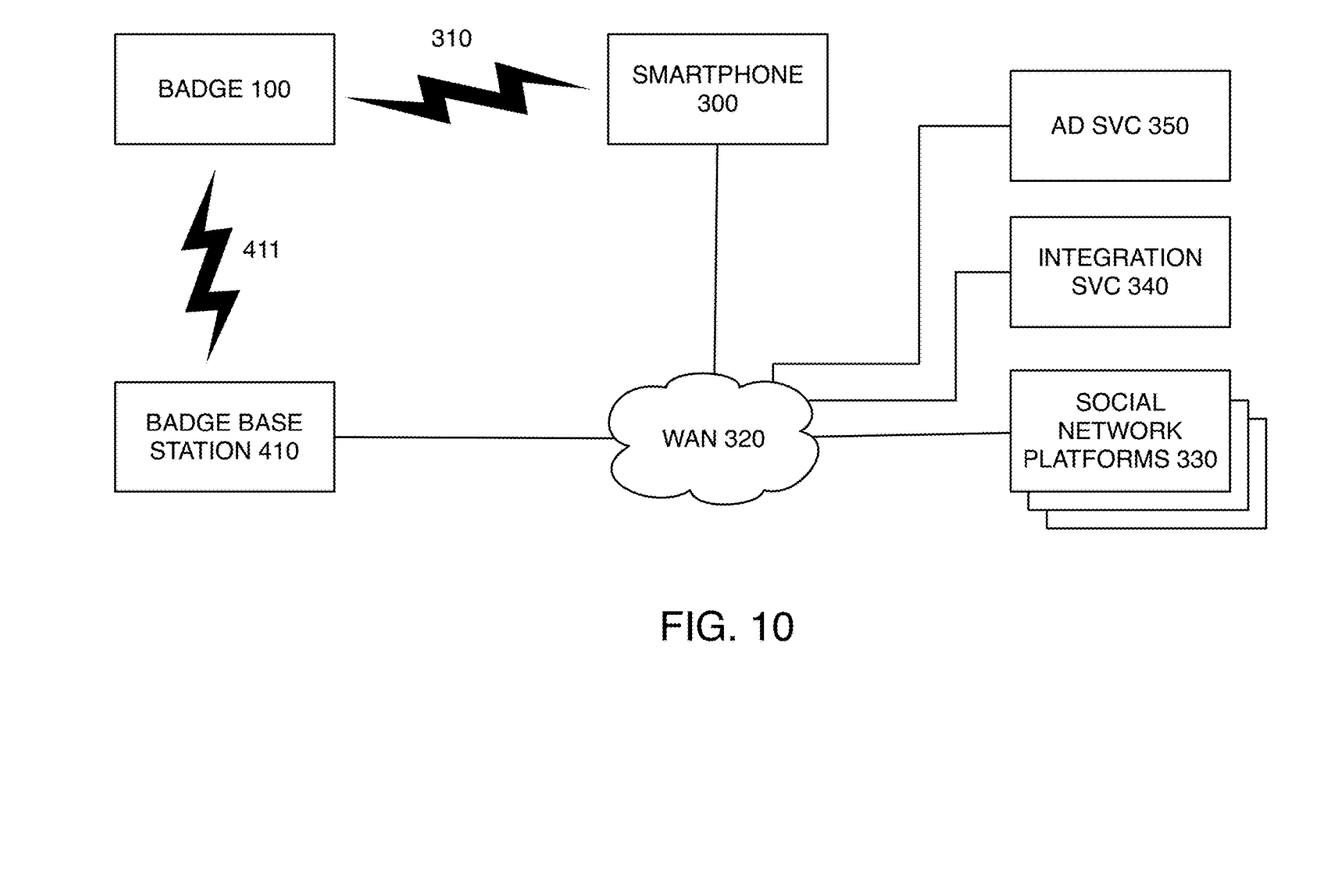
FIG. 10 is a schematic block diagram of a wireless badge system.

In accordance with one use case, individuals may utilize the wearable device as a personal fashion and lifestyle accessory. Uses may include, without limitation: display of personal status indicia, such as emoticons, image-based status indicia or text-based status indicia. Users may load status information and content onto badge 100 by using an application running on a user personal electronic device such as smartphone 300, interfacing with user configuration component 211 of badge application logic 210. FIG. 10 illustrates a computing environment in which badge 100 may be used, in accordance with an exemplary embodiment. Badge 100 is operated in conjunction with a personal computing device such as a smartphone, tablet computer, or personal computer; in this embodiment, smartphone 300. Smartphone 300 may then interact with badge 100 via local wireless communications link 310 (such as Bluetooth or NFC).

In some embodiments, badge 100 may access Internet-connected data systems. For example, smartphone 300 is adapted for digital communications via wide area network 320, which may include the Internet. Badge 100 may communicate data via local wireless data link 310; smartphone 300, in turn, can relay communications with Internet-connected data systems via WAN 320.

In some embodiments, wearable device 100 can be utilized to automatically display user-associated information from third party data services, such as social media sites. For example, badge application logic 210 may include social media interface 212, operating to cause smartphone 300 to periodically poll a user's account on one of social network platforms 320, and/or receive push notifications of content from one of social network platforms 320. Smartphone 300 may then relay such content to badge 100 via local wireless communications link 310. Badge 100, under control of social media interface 212, may then operate to render that content on display 120. Thus, a user can publicly share their Twitter™ or other social media account content with those around them.

Event and Hospitality Badging

Oftentimes, during conferences or other events with large numbers of people present, event attendees obtain badges and are expected to wear their badges during attendance at the event. Traditional event badging procedures suffer several drawbacks and disadvantages. For example, event badges are typically event-specific and user-specific, such that the badges are discarded after completion of the event, wasting resources and incurring costs for each event. Also, badges are often picked up by users at the start of an event. Often, badge pickup areas can be overcrowded during the beginning period of an event, resulting in long wait times and attendee frustration. If an event organizer dedicates more real estate within the event space for badge pickup to alleviate crowding, that space often goes underutilized after the initial rush of attendees during the beginning of the event. Also, worker staffing of badge pickup booths can be costly.

Figure 11:
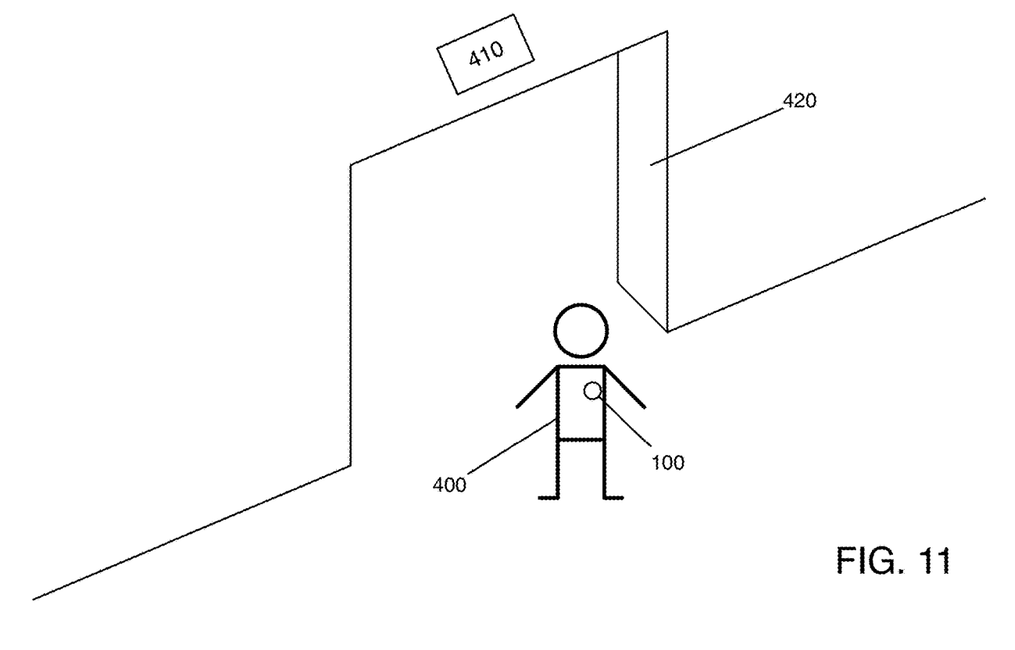
FIG. 11 is a diagram of a wireless badge monitoring environment.

In accordance with another embodiment, electronic badge 100 may be utilized as an attendee identification mechanism during conferences and other events. Badge application logic 210 may include event attendance interface 213, controlling interactions between badge 100 and external event attendance systems. FIG. 11 is a schematic illustration of an exemplary conference badge embodiment. User 400 wears badge 100 on their person while arriving at an event venue. In accordance with one use case, as user 400 approaches venue entrance 420, badge base station 410 communicates with badge 100 via local wireless communications protocol, such as NFC, Bluetooth or WiFi systems (illustrated as communication link 411 in the computing environment of FIG. 10). Base station 410 may be implemented using, e.g., a personal computing device with appropriate application software, a wireless beacon, an embedded system, or other computing platform with wireless communication capabilities. Badge 100 transmits a unique identification code to badge base station 410. Base station 410 looks up the unique identification code to correlate the identification code with the identity of user 400 (e.g. within a database integrated within base station 410, or via a network-connected database or application server accessible via network 320). The identity of user 400 can then be used to, e.g., automatically check in user 400 as attending the event, transmit a user-specific graphic for display on badge 100, and/or track the presence of badge 100 (and therefore user 400) over time at the location on badge base station 410. In some embodiments, multiple badge base stations can be installed in various locations around an event location to detect and track the presence of badges.

Badge 100 can also be used for hotel and hospitality applications. For example, a user's badge can be detected by a badge base station 410 upon entry of a hotel premises in order to check in the user to the hotel. Badge 100 may also exchange identification with a door lock via Bluetooth, WiFi and NFC to open a user's assigned hotel room. In some use cases, badge 100 may be utilized for multiple use cases simultaneously. For example, a user attending a conference at a hotel hosting a conference or other event can use badge 100 for both hotel room access and event attendance tracking.

In some embodiments, badge 100 (and particularly event attendance interface 213) may communicate directly with an event attendance management system. In other embodiments, WAN 320 may include a network-connected integration web service 340 for managing integrations with third party software platforms such as event attendance tracking services. Integration service 340 may include application logic to facilitate communications between badge 100 (directly or via smartphone 300) and third party platforms (such as via API integrations).

Organizational Applications

Badge 100 can also be used as a tracking tool within companies or other work organizations, including (without limitation) organizations in the hotel industry. For example, hotel staff members may each wear a badge 100 during their shift as a personal identification tool, while also providing a mechanism by which managers could track worker presence and location within the hotel or work facility. The location or room of hotel cleaning crew could be tracked, and associated with completion of work (e.g. progress in cleaning an assigned series of rooms).

Such applications could be implemented in varying ways. For example, in a badge embodiment having an integrated WiFi transceiver, the movement of badge 100 within a facility having distributed WiFi access points could be tracked based on access of the badge 100 to different routers or access points. The location of each access point or router is known, and the communications with badge 100 involve exchange of a unique identification number (e.g. MAC address or other UUID) that can be associated with the badge's wearer. In a badge embodiment having an integrated GPS receiver, the location of the badge wearer can be tracked locally via GPS and reported to a centralized monitoring server via WiFi, Bluetooth LE, NFC or other wireless communication protocol as the wearer moves throughout a work location. In an environment having distributed wireless beacons, the timing of badge interaction with beacons having known locations throughout a facility may be used to derive user tracking information. In yet other embodiments, a combination of GPS, access-point-based and/or beacon-based location tracking can be utilized to provide multiple sources of location information that can be combined for a more resilient location identification.

Advertising Applications

Badge 100 can also be used as an advertising device, connecting corporations and end users in a process that allows users of the badge (whether individual users, associations, organized groups such as trade unions of Boy Scouts™, organized fans or professional associations) to earn money by advertising logos or products on their badge while wearing the device. Users may be paid by advertisers. Advertisers may include corporations, or any organized entity that wants to advertise a product, event or cause on user badges.

Selection of advertising may be performed in a number of ways. In some embodiments, advertisements can be matched with badge wearers based on anonymized social demographics of the badge wearer. In some embodiments, advertisements can be matched with badge wearers based on the current location of the badge wearer (e.g. geographic region, presence within a city, presence within a particular venue, or the like).

A software platform, implemented on web-connected ad service server 350, may serve as a mediator between advertisers and persons or groups who carry an advertisement. The software platform can facilitate transferring logos, wording, video or other advertisement content to badge 100 (directly and/or via smartphone 300). A fee sharing arrangement can be facilitated by the platform; for example, without limitation, the software platform may provide 90% of advertiser fees to the badge wearer, while retaining 10% of advertiser fees for the platform operator.

Educational Applications

Badge 100, and the usage environment of FIG. 10, can also be utilized in education settings. For example, badge base station 410 can be utilized proximate entry to a classroom for tracking student attendance at classes and/or examinations. Badge base stations 410 can be used to transmit user-specific information such as student group assignments to students within a classroom. Integration service 340 may be utilized to facilitate interactions between classroom software application and badges 100.

In accordance with another aspect, badges 100 can be utilized by students as presentation remotes. Specifically, badge 100 can be placed into a remote controller mode of operation, in which case user interface mechanisms 230 can be used to transmit presentation controller commands via Bluetooth transceiver 254.

Journalism Applications

Badge 100 may also be used in journalism applications. For example, in video journalism applications in which a small team is broadcasting from remote locations with minimal equipment, a cameraperson can wear badge 100. Script text can be transmitted from smart phone 300 to badge 100 for teleprompter display to an on screen journalist.

Fashion Applications

Badge 100 may be utilized in fashion applications. Anyone, user or not, can create original graphic content for badge 100 (e.g. using available graphical application or an existing phone camera) for their own artistic expression purpose, or for others. An online commercial marketplace can be operated to facilitate purchase and sale of content for display on badges. In some embodiments, a companion application (e.g. an app for a mobile phone adapted for interaction with badge 100) can be used to create user groups, to facilitate sharing of badge content amongst multiple users.

Moreover, brand owners can develop original, and in some instances branded, graphical displays and designs. In some circumstances, such designs can be provided to users on a fee basis for rendering on display 120 as a fashion accessory. In some circumstances, fashion designers can develop images for pairing with specific clothing items from the designer. In some circumstances, fashion designers can offer original badge content as promotional items to develop brand interest and/or brand loyalty.

While depicted in the schematic block diagram of FIGS. 8 and 10 as block elements, in some instances with specific sub-elements, as known in the art of modern digital electronics, microcontrollers and other microprocessor-based components may be implemented in a variety of ways, including via distributed hardware and software resources and using any of multiple different software stacks. They may include a variety of physical, functional and/or logical components. That said, their implementation will typically include at some level one or more physical microprocessors and digital memory for, inter alia, storing instructions which, when executed by the processors, cause the components to perform methods and operations described herein.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or any appended claims.

The invention claimed is:

1. An electronic badge comprising:
   an electronic display screen positioned on an outwardly-facing surface of the badge;
   one or more wireless transceivers facilitating wireless digital communications between the badge and a personal electronic device;
   a microcontroller implementing application logic to control content displayed on the electronic display screen based on information received from the personal electronic device;
   a pin mechanism secured to a backside of the badge, the pin mechanism comprising:
   a hook mounted to the backside of the badge proximate a first badge edge; and
   a pin having a pin body extending across the backside of the badge with a first end and an opposing second end, the first end positioned for alternative engagement and disengagement with the hook, and the second end pivotally attached to the backside of the badge proximate a second edge of the badge;
   a flat magnet layer secured to the backside of the badge, the magnet layer comprising an open channel exposing a portion of the backside of the badge underlying the pin body; and
   a metal backing plate which may be stowed in (a) a first position during use of the pin mechanism for mounting the electronic badge, in which the metal backing plate is magnetically secured directly against the flat magnet layer, or (b) a second position in which the badge is secured to an object interposed between the metal backing plate and the flat magnet layer towards which the metal backing plate is attracted.

2. The electronic badge of claim 1, in which the metal backing plate comprises a central open channel through which the pin body and the hook may be extended while the metal backing plate is in the first position.

3. The electronic badge of claim 1, in which:
the pin mechanism further comprises a circumferential portion circumscribing a perimeter of the backside of the badge and secured to the backside of the badge; and
the flat magnet layer is positioned within the circumferential portion of the pin mechanism.

4. The electronic badge of claim 1, in which the flat magnet layer comprises a first magnet portion and a second magnet portion, separated from one another on the backside of the badge by a channel oriented beneath the pin body.

* * * * *